United States Patent [19]
Niebauer

[11] Patent Number: 5,791,833
[45] Date of Patent: Aug. 11, 1998

[54] CUTTING INSERT HAVING A CHIPBREAKER FOR THIN CHIPS

[75] Inventor: Kenneth L. Niebauer, Raleigh, N.C.

[73] Assignee: Kennametal Inc., Latrobe, Pa.

[21] Appl. No.: 365,906

[22] Filed: Dec. 29, 1994

[51] Int. Cl.$^6$ ............................................. B26D 1/00
[52] U.S. Cl. .............................. 407/114; 407/116
[58] Field of Search .......................... 407/114, 116

[56] References Cited

U.S. PATENT DOCUMENTS

| | | |
|---|---|---|
| 3,973,308 | 8/1976 | Lundgren . |
| 4,044,439 | 8/1977 | Romagnolo .................. 407/114 |
| 4,215,957 | 8/1980 | Holma et al. ................. 407/114 |
| 4,447,175 | 5/1984 | Warren ........................... 407/114 |
| 4,880,338 | 11/1989 | Stashko ........................ 407/114 |
| 4,934,879 | 6/1990 | van Barneveld ............. 407/66 |
| 4,988,242 | 1/1991 | Pettersson et al. .......... 407/114 |
| 5,282,703 | 2/1994 | Itaba et al. ................... 407/114 |

*Primary Examiner*—A. L. Pitts
*Attorney, Agent, or Firm*—John M. Vasuta

[57] ABSTRACT

A cutting insert having a chipbreaking configuration for effectively embrittling and breaking thin, foil-like chips produced by drilling or other fine-cutting operations is provided. The cutting insert includes a polygonal insert body having a top surface, a side relief surface, and a cutting edge defined therebetween, and a chipbreaker formed by an elongated groove disposed on the top surface behind the cutting edge in combination with a plurality of recesses disposed over the groove having opposing side edges. The back wall of the groove applies curling forces to the chips, while the opposing side edges of the recesses engage and corrugate the chips thereby embrittling them by work-hardening. The corrugated chips are broken by the curling forces applied by the back and rear walls of the groove and the recesses into small pieces that are easily expelled from the vicinity of the cutting operation.

14 Claims, 4 Drawing Sheets

5,791,833

1

CUTTING INSERT HAVING A CHIPBREAKER FOR THIN CHIPS

BACKGROUND OF THE INVENTION

This invention generally relates to cutting inserts, and is particularly concerned with a cutting insert having a chipbreaker that effectively breaks thin, foil-like chips that result from fine cuts on a workpiece.

Cutting inserts for machining metal workpieces are well known in the prior art. All such inserts include a cutting edge formed at the intersection of two of the walls of the insert body. When such inserts are mounted in a milling head or drill that is rotated and engaged against a metal workpiece, the cutting edges remove metal from the workpiece in the form of ribbon-like metal chips.

Such metal chips can interfere with the cutting operation if they are not continuously removed from the vicinity of the cutting operation. Accordingly, many inserts are manufactured with a chipbreaking geometry that continuously embrittles and breaks the chips as they are formed by the cutting edge. For inserts performing rough cuts on workpieces, the chipbreaking geometry may be comprised of only a positive rake angle on the cutting edge. Such a positive rake angle naturally causes the relatively thick chips created in a rough cut operation to continuously curl, embrittle, and break into small pieces. For finer cuts, where the chips are more ribbon-like, a chipbreaking groove is provided behind the cutting edge. As the thinner, more ductile chips formed from a finer cutting operation flow into such a groove and engage the rear wall thereof, curling forces are applied to them which embrittle them and cause them to break into small pieces which can be evacuated from the vicinity of the cutting operations. The applicant has observed that, for effective chipbreaking to take place, the width of such a chipbreaking groove should be approximately five times the thickness of the chips produced by the cutting edge.

While the provision of such a chipbreaking groove is effective in curling and breaking chips produced by fine cutting operations, the applicant has observed that such a structure has limits and is not well suited for breaking the very thin chips produced in very fine cutting operations. For example, when such cutting inserts are mounted on the end of a drill that advances only about 0.007 inches per revolution in a workpiece, the inserts produce very thin chips having thicknesses that broadly vary between 0.005 and 0.009 inches. Such chips are more foil-like than ribbon-like, and are more difficult to curl and embrittle to the extent necessary to cause them to continuously break into small pieces. It is possible to provide an effective chipbreaking groove for a thin, foil-like chip of a particular thickness. However, the applicant has found that the operational tolerances of such a chipbreaking groove are very low. For example, when the groove is dimensioned to break chips having a thickness of 0.007 inches, chips having a thickness near the 0.005 inch end of the range are not effectively expelled from the chipbreaking groove, which causes chips to accumulate, thereby generating excessive pressures on the cutting edge. Such excessive pressures can accelerate insert wear and the possibility of insert breakage. Moreover, chips having a thickness near the 0.009 inch end of the range are not effectively curled and embrittled. Such unbroken chips form long streamers that are not effectively evacuated by the flutes of the drill, which in turn interferes with the drilling operation. Clearly, there is a need for an insert having a chipbreaking configuration that effectively breaks fine cutting operations on workpieces. The chipbreaking configuration in such an insert should effectively embrittle and continuously break such thin, foil-like chips over a broad range of chip thicknesses so that the cutting tools that employ such inserts will effectively operate over a broad range of machining conditions. Additionally, the chipbreaking configuration employed in the insert should be easy to integrate into a broad range of insert shapes and sizes.

SUMMARY OF THE INVENTION

Generally speaking, the invention is a cutting insert that eliminates or ameliorates all of the aforementioned shortcomings associated with the prior art by means of a chipbreaker configuration that effectively breaks thin, foil-like chips generated as a result of fine-cutting operations over a broad range of thicknesses. To this end, the cutting insert comprises an insert body having a cutting edge defined by an intersection of top and side relief surfaces, and a chipbreaker configuration including the combination of an elongated groove disposed on the top surface of the insert adjacent to the cutting edge, and a plurality of discrete recesses axially spaced apart over the groove. Both the groove and the individual recesses include a back or rear wall opposite to the cutting edge that terminates at a point higher on the top surface of the insert than the edge for curling and work-hardening the chips. Additionally, each of the discrete recesses has a pair of opposing side edges for engaging and corrugating the chips as they flow from the cutting edge toward the back and rear walls of the groove and recesses. The combination of the corrugating and curling forces applied by the recesses and the groove effectively work-hardens the thin foil-like chips generated during a fine-cutting operation, thereby embrittling them and causing them to continuously break into small segments that are easily expelled from the vicinity of the cutting operation.

The top surface of the insert body preferably includes a land surface disposed between the cutting edge and the groove for strengthening the edge. The width of the groove is preferably between about four and six times the thickness of the chips removed from the workpiece, so that many of the chips will be effectively curled and work-hardened by the groove. The width of the recesses may exceed the width of the groove in order to extend the length of the side edges and thereby increase the amount of corrugating engagement between the chips and the recess side edges.

The height of the back wall of the groove may be between about 80 to 120% greater than the height of the descending wall of the groove that ultimately interconnects with the cutting edge. Similarly, the height of the rear wall of each of the recesses may have a height that is between about 50 to 100% greater than the height of the front wall of the recesses. Such proportioning insures that the back and rear walls will provide sufficient curling forces on the thin, corrugated chips to effectively embrittle and break them.

Finally, the aggregate length of the recesses should be about 50% of the overall length of the groove. Such proportioning insures that the amount of corrugating forces applied to the thin, foil-like chips will embrittle them to a point where effective chipbreaking is assured when the back and rear walls of the groove and recesses apply their respective curling forces on the chips.

BRIEF DESCRIPTION OF THE SEVERAL FIGURES

DETAILED DESCRIPTION OF THE PREFERRED EMBODIMENT

Figure 1:
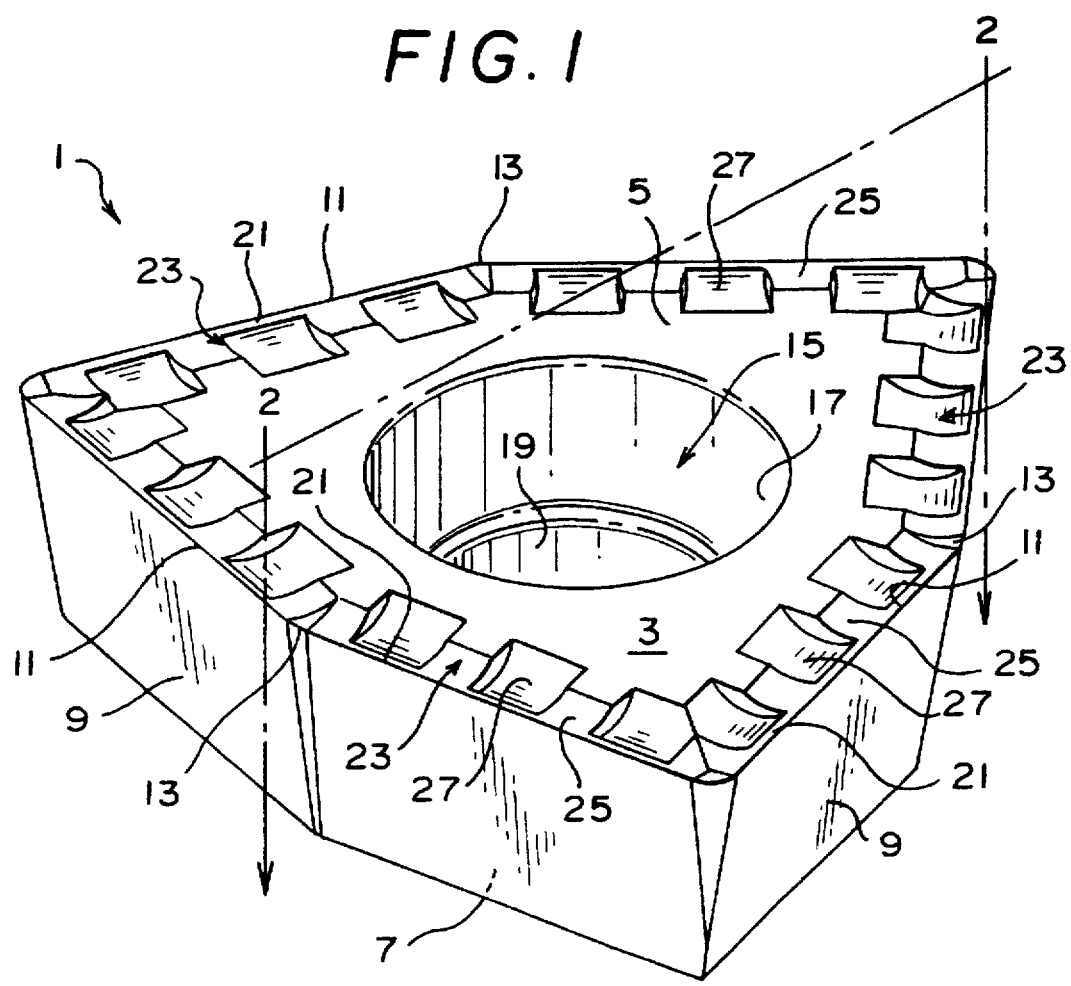
FIG. 1 is a perspective view of a cutting insert embodying the invention.
Figure 2:
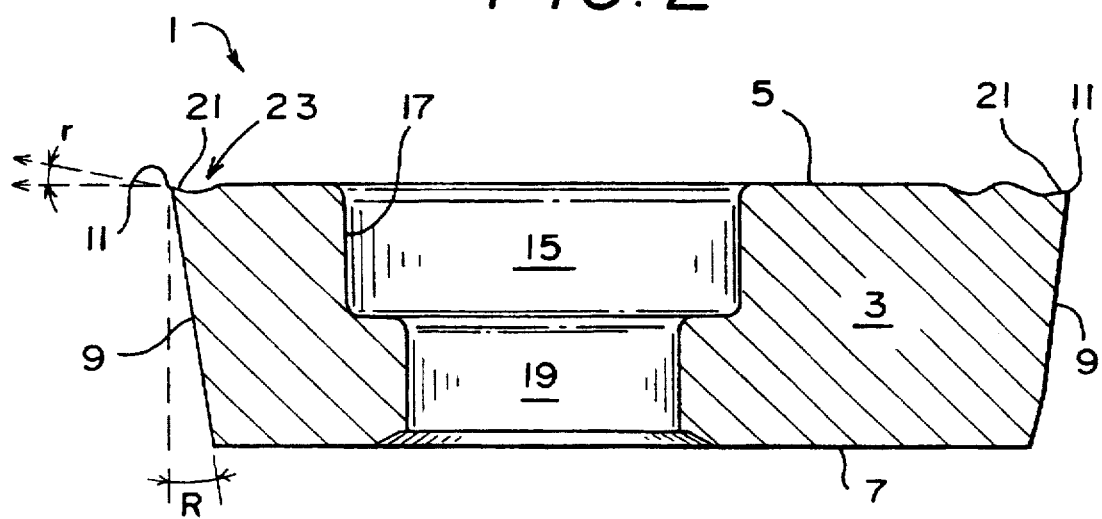
FIG. 2 is a cross-sectional side view of the insert illustrated in FIG. 1, along the line 2—2.

With reference now to FIGS. 1 and 2, wherein like numerals designate like components throughout all the several figures, the cutting insert 1 of the invention generally comprises a trigon-shaped body 3 having a top surface 5 and a bottom surface 7 which are interconnected by means of three side relief surfaces 9. Cutting edges 11 are defined around the insert body 3 at the intersection between the top surface 5 and the side relief surfaces 9. As is shown in FIG. 2, the relief angle R of the side surfaces 9 with respect to a line orthogonal to the top surface 5 is preferably on the order of 10°. Each of the side relief surfaces 9 is bent at a 155° obtuse angle at a centrally located vertex 13 as shown. As will be discussed in more detail with respect to FIGS. 8 and 9, the provision of such an obtuse vertex 13 in each of the side cutting edges 11 helps to stabilize the insert 1 when it is used in a drilling operation. A screw mounting hole 15 is centrally disposed in the body 3 of the insert 1 for receiving a mounting screw 16 for securing the insert 1 in a seat of a toolholder. The screw mounting hole 15 includes a head receiving portion 17, and a shank receiving portion 19.

In all of the preferred embodiments, the cutting insert 11 is manufactured from a hard, wear-resistant material, of which many are known in the art.

Figure 3:
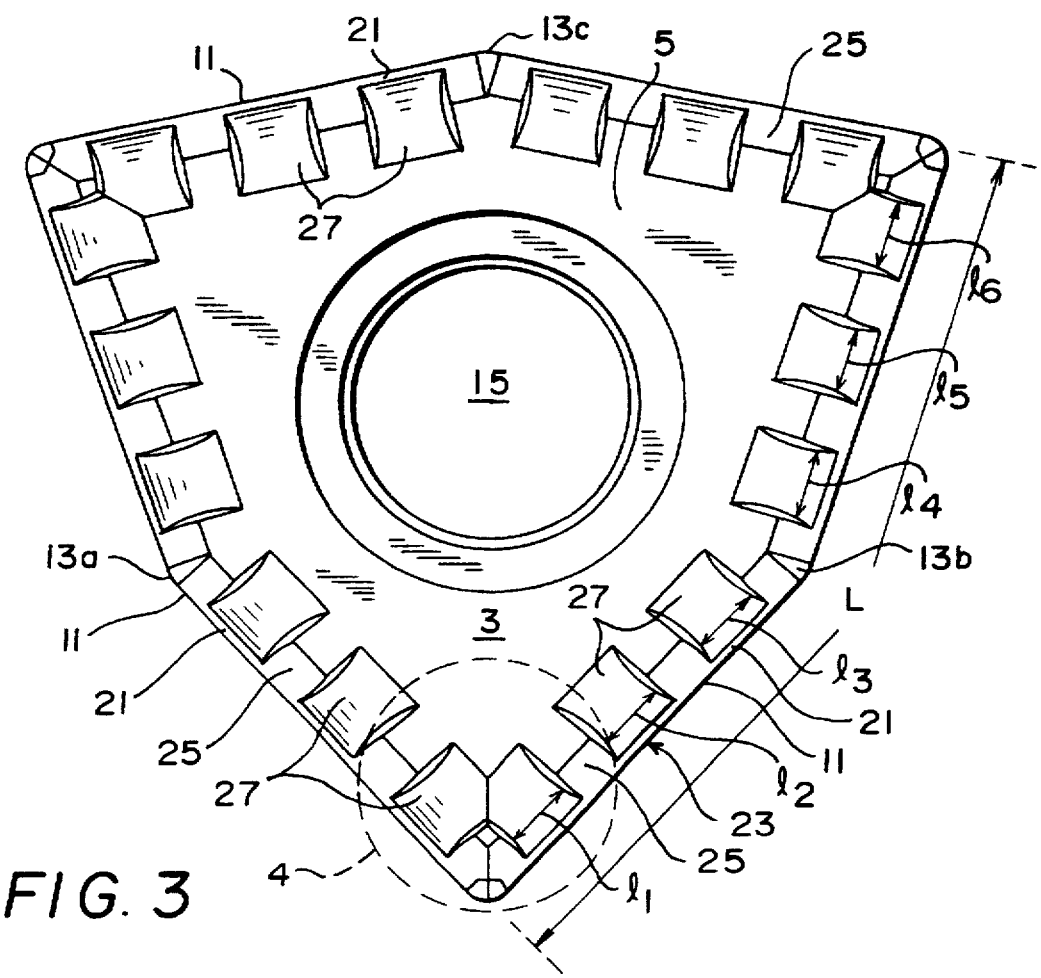
FIG. 3 is a plan view of the insert illustrated in FIG. 1.
Figure 4:
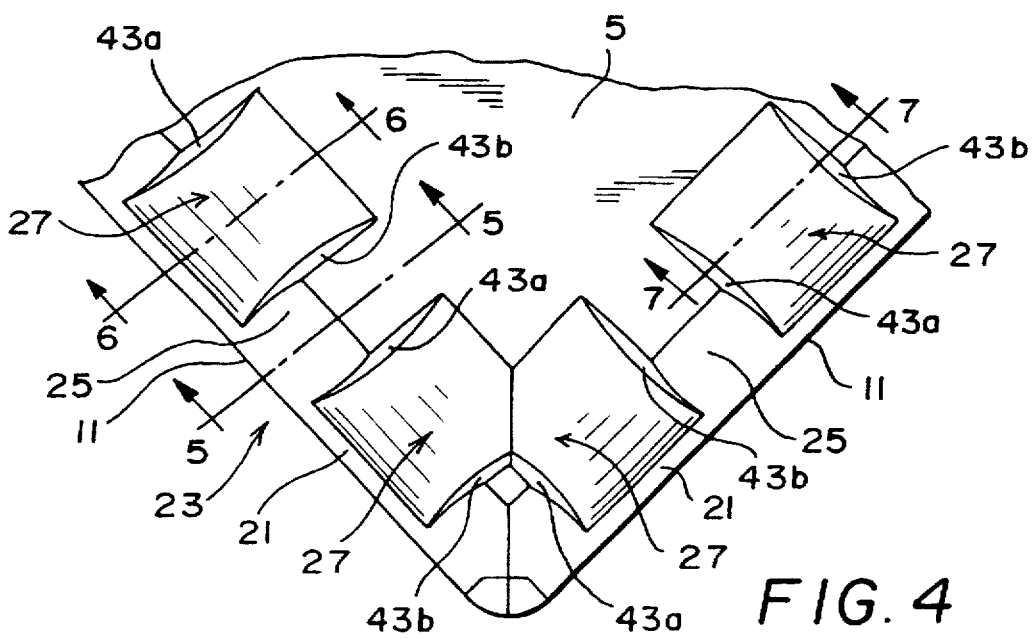
FIG. 4 is an enlarged view of the portion enclosed in the dotted circle in FIG. 3.

With reference now to FIGS. 3 and 4, a land surface 21 is provided immediately behind the cutting edges 11 for strengthening these edges. The land surfaces 21 are disposed in an angle r which is about 10° with respect to the horizontally-disposed upper surface 5 (indicated in FIG. 2). The inclination of the land surfaces 21 at such a 10° angle imparts a positive rake angle to these edges, which in turn lowers cutting forces, and protracts the useful life span of the insert 1. In the example of the insert 1 disclosed throughout the several figures, all land surfaces 21 are approximately 0.005 inches wide.

Disposed directly behind the land surface 21 of each of the cutting edges 11 is a chipbreaker configuration 23. The chipbreaker configuration 23 includes an elongated groove 25 that borders the land surface 21 opposite the cutting edge 11. Further included in the configuration 23 is a plurality of spaced recesses 27 that overlap and extend behind the elongated grooves 25 as shown. As will be described in more detail shortly, the upper edges of the recesses 27 corrugate and embrittle thin, foil-like chips generated by the cutting edges 11 while the elongated grooves 25 curl and break the corrugated chips into small pieces.

Figure 5:
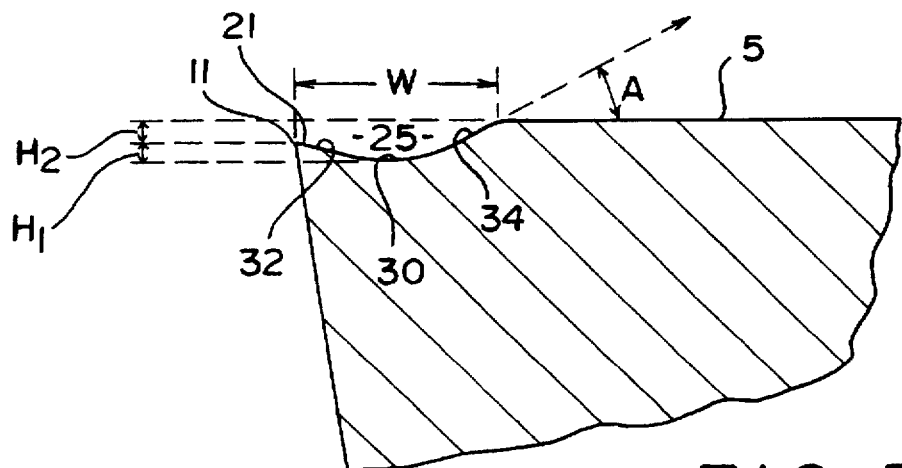
FIG. 5 is a cross-sectional side view of the portion of the insert illustrated in FIG. 4 along the line 5—5.
Figure 6:
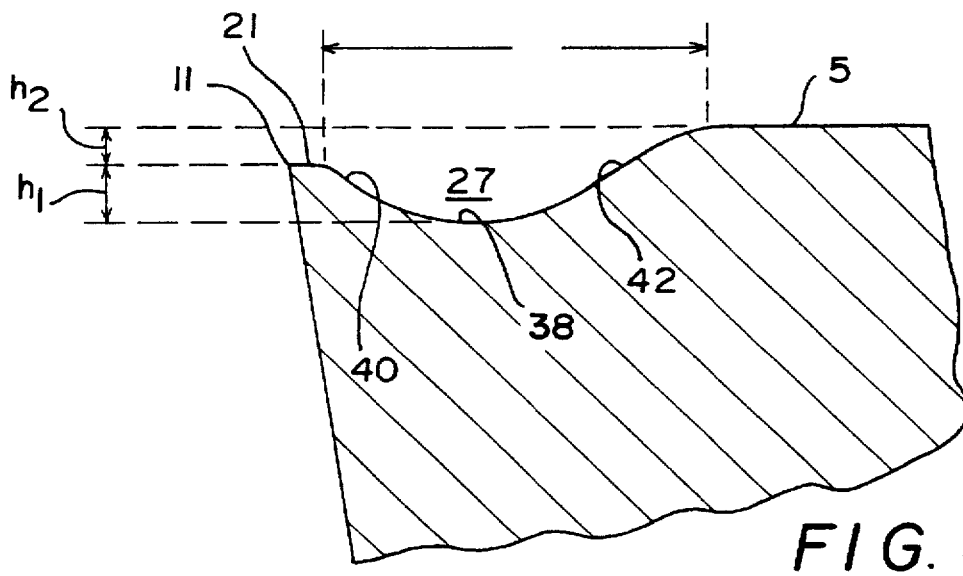
FIG. 6 is a cross-sectional side view of the portion of the insert illustrated in FIG. 4 along the line 6—6.
Figure 7:
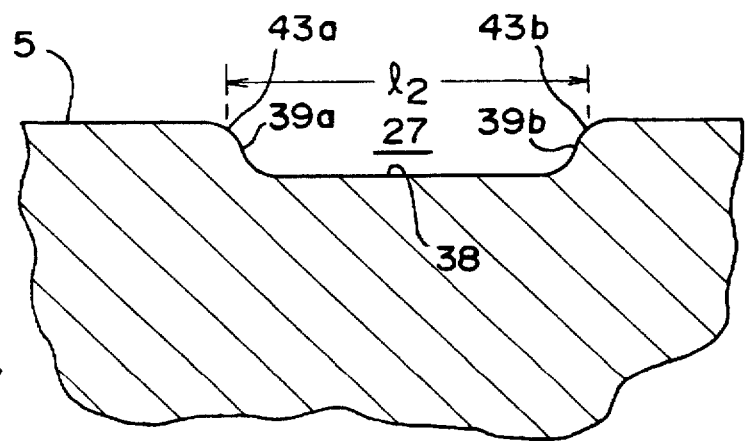
FIG. 7 is a cross-sectional front view of the portion of the insert illustrated in FIG. 4 along the line 7—7.

With reference now to FIGS. 5 through 7, each of the grooves 25 behind the cutting edges 11 includes a radiused bottom wall 30, and a descending wall 32 that interconnects the bottom wall 30 with the edge of the land surface 21 of each edge 11. A back wall 34 interconnects the bottom wall 30 with the top surface 5 of the insert body 3 at a point which is approximately 100% higher than the cutting edge 11 with respect to the surface 5. Hence, if the height of the cutting edge 11 with respect to the lower most point of the bottom wall 30 is H1, then the maximum height of the back wall 34 of the groove 25 is higher than the edge 11 by a distance H2 which is approximately the same as H1. In the preferred embodiment, the angle A of the back wall 34 with respect to the generally planar top surface 5 is approximately 30°. The combined width W of the groove 25 and land 21 is approximately 0.030 inches. Such dimensioning allows the chipbreaking grooves 25 behind each of the cutting edges 11 to effectively curl and work-harden the 0.005 to 0.009 inch thick corrugated chips produced by the top edges of the recesses such that the chips are effectively broken.

With reference now to FIGS. 6 and 7, each of the recesses 27 includes a bottom wall 38 which is somewhat deeper than the previously described bottom wall 30 of the chipbreaking grooves 35. Each of the recesses further includes a pair of sidewalls 39 which are orthogonally disposed to the cutting edge 11 to which the recess 27 is adjacent to. A front wall 40 interconnects the land surface 21 behind the cutting edge 11 with the bottom wall 38. Additionally, a rear wall 42 interconnects the bottom wall 38 with the top surface 5 of the insert body 3 at a point that is higher than the cutting edge 11. Hence, if the height of the cutting edge with respect to the lower most point on the bottom wall 38 is h1, the maximum height of the rear wall 42 is higher than h1 by h2, which is between about 50 to 100% greater than h1. As was the case with the angle of the back wall 34 of the groove 25, the angle of the rear wall 42 is approximately 30° with respect to the top surface 5 of the insert body 3. Additionally, the width of each of the recesses 27 is approximately 0.045 inches, and the recesses are spaced apart about 0.030 inches, such that the aggregate width of the recesses 27 is about 50% of the overall length L of the edges 11. In particular, the length "1" between the opposing edges 43a,b of the sidewalls 39a,b of each of the recesses 27 is likewise about 0.045 inches.

Figure 8:
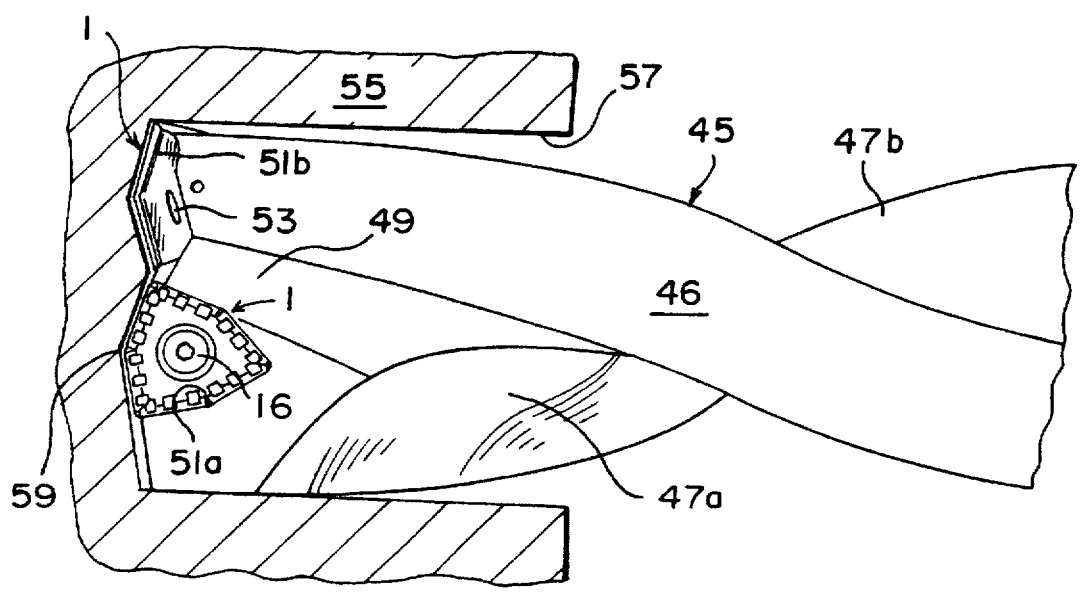
FIG. 8 is a side view of a drill boring a hole in a workpiece by means of inserts embodying the invention.
Figure 9:
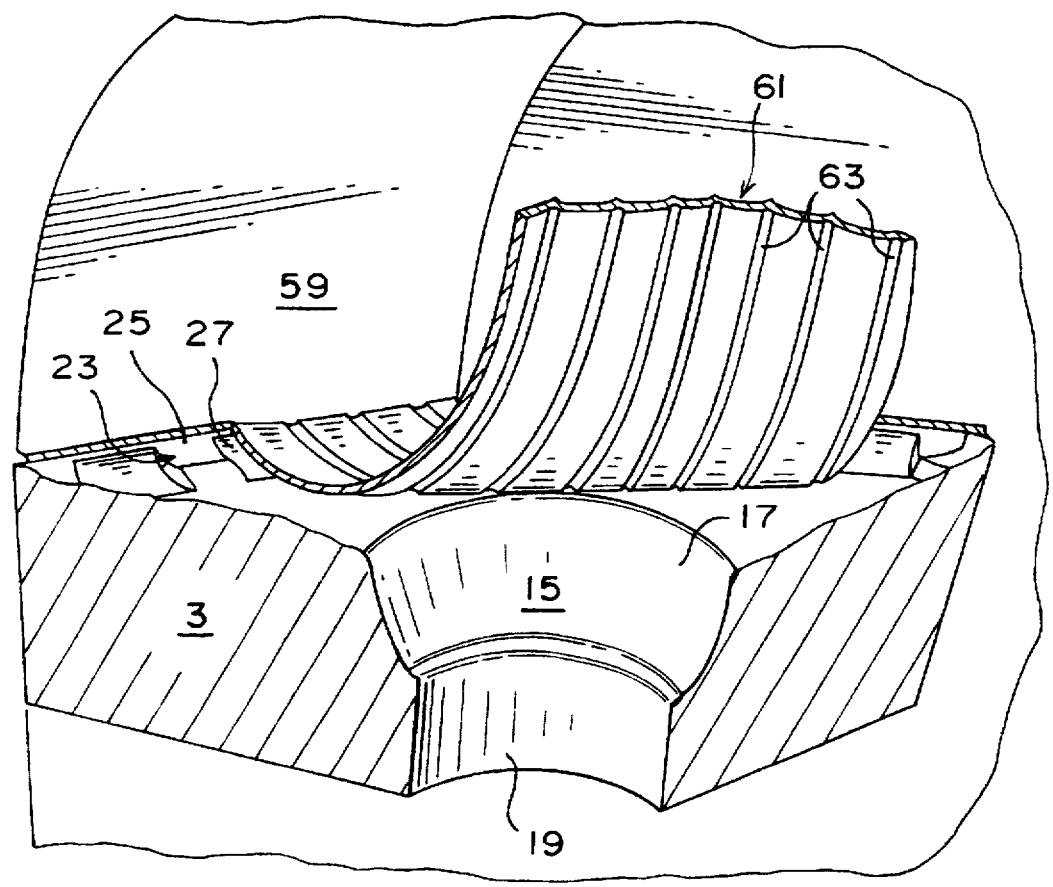
FIG. 9 is a partial perspective view of the insert illustrated in FIG. 1 in operation (without the surrounding drill body) illustrating how the groove and recesses behind the cutting edges of the insert curl and corrugate chips of material removed from the workpiece.

With reference now to FIGS. 8 and 9, the insert 1 of the invention is particularly adapted for use in a drill 45 having a helical body 46 with spiral flutes 47a,b. The distal end portion 49 of the drill 45 preferably includes a pair of opposing offset insert seats 51a,b for receiving and securely mounting the inserts 1 by means of a mounting screw 16. Coolant openings 53 (of which only one is shown) constantly spray a liquid coolant during the operation of the drill in order to both lower the temperature of the interface between the inserts 1 and workpiece 55, and expel the resulting metal chips.

When such a drill 45 is rotated and forcefully engaged against a metal workpiece 55, it removes approximately 0.007 inches of material per revolution, thereby producing thin, foil-like chips having a thickness of between 0.005 and 0.009 inches. During such a drilling operation the obtuse vertex 13 disposed in the middle of each of the cutting edges 11 helps to stabilize the cutting edges by defining a forward leading portion of the cutting edge 11 which bites into the metal workpiece 55 before the trailing side portions of the cutting edges 11 do. If there was no obtuse vertex 13 present in the cutting edge 11, the entire cutting edge would engage the workpiece 55 simultaneously, which could result in drill chatter and vibration that ultimately could chip and damage the cutting edge 11.

As the cutting edge 11 cuts the bottom surface 59 of the bore 57 illustrated in the workpiece 55, it creates thin, foil-like chips of the thicknesses previously described. These chips forcefully engage the side edges 43a,b of the recesses 27, thereby creating corrugations 63 in the chip 61. The generation of such corrugations 63 work-hardens and embrittles the chip 61. As the chip 61 engages the back wall 34 of the grooves 25 and the rear walls 42 of the recesses 27, curling forces are applied to them which further embrittle them, and cause them to break into small enough pieces such that pressurized coolant applied to the chips via openings 53 in combination with the centrifugal forces applied to the chips 61 by the drill body 46 causes the chips 61 to be continuously thrown out of the spiral flutes 47a,b of the drill 45, away from the vicinity of the drilling operation.

Although the invention has been described with particular respect to a preferred embodiment, various changes, additions, and modifications of the invention will become apparent to those of skill in the art. All such changes, modifications, and additions are intended to be encompassed within the scope of this patent, which is limited only by the claims appended hereto.

What is claimed:

1. A cutting insert for cutting a workpiece by removing chips of material therefrom, comprising:

an insert body having a top surface and a bottom surface and a side relief surface and a cutting edge defined by an intersection of said top and side surfaces, and a chipbreaking means for breaking chips having a predetermined thickness formed by said cutting edge including an elongated groove disposed on said top surface adjacent to said cutting edge, said groove having a back wall for curling and work-hardening said chips, said back wall being opposite said edge and terminating at a point higher on said top surface than said edge, and a plurality of discrete recesses axially spaced apart in said groove having means for engaging and corrugating said chips to facilitate chipbreaking including substantially linear opposing side edges that are aligned orthogonally with respect to said cutting edge for engaging and corrugating chips, and which traverse said back wall of said groove, wherein the width of said recesses exceeds the width of said groove for increasing the amount of corrugating engagement between said chips and said side edges of said recesses.

2. The cutting insert of claim 1, wherein said insert body further includes a land surface disposed between said cutting edge and said groove for strengthening said edge.

3. The cutting insert of claim 2, wherein said groove further includes a bottom wall, and a descending wall interconnecting said land surface with said bottom wall of said groove for defining a rake surface.

4. The cutting insert of claim 1, wherein said groove has a width that is between about four and six times the thickness of chips removed from said workpiece by said cutting edge.

5. The cutting insert of claim 1, wherein said recesses in said groove have a combined length that is over half of an overall length of said groove.

6. The cutting insert of claim 1, wherein said insert body is polygonal.

7. The cutting insert of claim 6, wherein said insert body is a trigon, and said cutting edge along each side relief surface includes an obtuse vertex in a middle portion thereof to stabilize said insert during a drilling operation.

8. The cutting insert of claim 5, wherein each of said recesses includes a bottom wall that is deeper than the bottom wall of the chipbreaking groove, and a rear wall that extends farther away from the cutting edge than said back wall of said groove and terminates at a point higher on said top surface than said edges.

9. A cutting insert for cutting a workpiece by removing chips of material therefrom, comprising:

a polygonal insert body having a top surface and a side relief surface and a cutting edge defined by an intersection of said top and side surfaces, and a land surface disposed behind said cutting edge for defining a rake surface, and a chipbreaking means for breaking chips formed by said cutting edge including an elongated groove disposed on said top surface behind said land surface, said groove having a bottom wall, a descending wall interconnecting said land surface with said bottom wall, and a back wall interconnecting said bottom wall for curling chips produced by said cutting edge, said back wall terminating at a point on said top surface higher than said edge, and a plurality of discrete recesses axially spaced apart in said groove having substantially linear side edge means oriented substantially orthogonally to said edge for engaging and corrugating said chips to facilitate the breaking of said chips, said side edge means traversing said back wall of said groove, wherein the width of said recesses exceeds the width of said groove for increasing the amount of corrugating engagement between said chips and said side edge means of said recesses.

10. The cutting insert of claim 9, wherein the height of the back wall of said groove is between about 80 to 120% greater than the height of the descending wall.

11. The cutting insert of claim 10, wherein the width of said groove is between about four and six times the thickness of chips removed from said workpiece by said cutting edge.

12. The cutting insert of claim 11, wherein the width of the recesses is approximately twice as much as the width of the groove for extending the length of the side edges and thereby increasing the amount of corrugating engagement between said chips and said side edges of said recess.

13. The cutting insert of claim 12, wherein each of said recesses includes a bottom wall, a front wall interconnecting said land surface with said bottom recess wall, and a rear wall having a height that is between about 50 to 100% greater than the height of the front wall.

14. A cutting insert for cutting a workpiece by removing chips of material therefrom, comprising:

an insert body having a top surface and a bottom surface and a side relief surface and a cutting edge defined by an intersection of said top and side surfaces, and a chipbreaking means for breaking chips having a predetermined thickness formed by said cutting edge including an elongated groove disposed on said top surface adjacent to said cutting edge, said groove having a back wall for curling and work-hardening said chips, said back wall being opposite said edge and terminating at a point higher on said top surface than said edge, and a plurality of discrete recesses axially spaced apart in said groove having means for engaging and corrugating said chips to facilitate chipbreaking including substantially linear opposing side edges that are aligned orthogonally with respect to said cutting edge for engaging and corrugating chips, wherein the width of said recesses exceeds the width of said groove for increasing the amount of corrugating engagement between said chips and said side edges of said recesses.

* * * * *